US010414855B2

United States Patent
Petway et al.

(10) Patent No.: US 10,414,855 B2
(45) Date of Patent: Sep. 17, 2019

(54) MULTIFUNCTIONAL POLYAMIDES FOR PROTECTIVE COATINGS

(71) Applicant: Huntsman Advanced Materials Americas LLC, The Woodlands, TX (US)

(72) Inventors: Lorenzo Petway, Spring, TX (US); Dong Le, Spring, TX (US); Charles Uchenna Uzoezie, Dallas, TX (US)

(73) Assignee: HUNTSMAN ADVANCED MATERIALS AMERICAS LLC, The Woodlands, TX (US)

( * ) Notice: Subject to any disclaimer, the term of this patent is extended or adjusted under 35 U.S.C. 154(b) by 0 days.

(21) Appl. No.: 15/308,128

(22) PCT Filed: May 13, 2015

(86) PCT No.: PCT/US2015/030446
§ 371 (c)(1),
(2) Date: Nov. 1, 2016

(87) PCT Pub. No.: WO2015/175583
PCT Pub. Date: Nov. 19, 2015

(65) Prior Publication Data
US 2017/0051100 A1 Feb. 23, 2017

Related U.S. Application Data

(60) Provisional application No. 61/992,949, filed on May 14, 2014.

(51) Int. Cl.
| | |
|---|---|
| *C08G 59/44* | (2006.01) |
| *C09D 163/00* | (2006.01) |
| *C08G 69/26* | (2006.01) |
| *C08G 59/18* | (2006.01) |
| *C08G 59/54* | (2006.01) |
| *C08G 69/40* | (2006.01) |
| *C08G 73/02* | (2006.01) |

(52) U.S. Cl.
CPC .......... *C08G 59/44* (2013.01); *C08G 59/182* (2013.01); *C08G 59/54* (2013.01); *C08G 69/26* (2013.01); *C08G 69/40* (2013.01); *C08G 73/028* (2013.01); *C09D 163/00* (2013.01)

(58) Field of Classification Search
CPC ........ C08G 59/40; C08G 59/42; C08G 59/44; C08G 59/50; C08G 59/4207; C08G 59/4215; C08G 59/4223; C08G 59/423; C08G 59/4238; C08G 59/5006; C08G 59/5026; C08G 59/5033; C08G 59/504; C08G 69/02
See application file for complete search history.

(56) References Cited

U.S. PATENT DOCUMENTS

| | | | |
|---|---|---|---|
| 3,140,566 A | 7/1964 | Wagner et al. | |
| 3,663,651 A | 5/1972 | Traut et al. | |
| 4,070,225 A | 1/1978 | Bardorf | |
| 4,247,426 A * | 1/1981 | Hinze | C08G 69/34 528/111.3 |
| 5,130,351 A | 7/1992 | Golownia | |
| 5,202,051 A | 4/1993 | Lopez | |
| 5,319,062 A | 6/1994 | Hitoshi et al. | |
| 5,476,748 A | 12/1995 | Steimann et al. | |
| 5,565,505 A | 10/1996 | Papalos et al. | |
| 5,639,413 A | 6/1997 | Crivello | |
| 5,948,881 A | 9/1999 | Nandlal et al. | |
| 5,972,563 A | 10/1999 | Steimann et al. | |
| 6,111,030 A | 8/2000 | Terrence et al. | |
| 6,500,192 B1 | 12/2002 | Winfried | |
| 7,300,963 B2 | 11/2007 | Birnbrich et al. | |
| 7,655,736 B2 | 2/2010 | Vedage et al. | |
| 8,293,863 B2 | 10/2012 | Vedage et al. | |
| 2003/0055209 A1 * | 3/2003 | Wang | C08G 69/04 528/310 |
| 2005/0215730 A1 * | 9/2005 | Schoenfeld | C08G 59/4261 525/533 |
| 2007/0287809 A1 * | 12/2007 | Vedage | C08G 59/44 525/423 |
| 2010/0084601 A1 * | 4/2010 | Thetford | B01F 17/0057 252/182.3 |
| 2011/0028603 A1 * | 2/2011 | Peretolchin | C08G 59/18 523/446 |
| 2012/0190799 A1 | 7/2012 | Natesh et al. | |
| 2012/0237774 A1 | 9/2012 | Raymond et al. | |

FOREIGN PATENT DOCUMENTS

| | | |
|---|---|---|
| CN | 102822236 A | 12/2012 |
| EP | 0654465 A1 | 5/1995 |
| EP | 2714763 A1 | 4/2014 |

(Continued)

OTHER PUBLICATIONS

Huntmans Jeffamine Polyetheramines, 2007. (Year: 2007).*
PubChem Fatty acids, C18-unsaturated, trimers, downloaded Jan. 14, 2019 (Year: 2019).*
EP Search Report dated Nov. 3, 2017, for Patent Application No. 15792518.1, 7 pages.
Google Patent partial English translation of Chinese application No. 102822236, granted on Aug. 13, 2014, 1 page.
English translation of Japanese office action dated Oct. 24, 2018, in the prosecution of Japanese patent application No. 2016-567504, 5 pages.

(Continued)

*Primary Examiner* — Christopher M Rodd
(74) *Attorney, Agent, or Firm* — Huntsman Advanced Materials Americas LLC; Monique Raub

(57) ABSTRACT

The present disclosure relates to a curing agent component for a curable resin which includes a multifunctional polyamide obtained from the reaction of a polyamine and a polycarboxylic acid. The curing agent component may be used as part of a two component curable system for the curing of curable resins including epoxy resins.

14 Claims, No Drawings

(56) References Cited

FOREIGN PATENT DOCUMENTS

| | | |
|---|---|---|
| JP | H7216304 A | 8/1995 |
| JP | 2011225869 A | 11/2011 |
| JP | 2015074683 | 4/2015 |
| WO | WO-2009021986 A1 * | 2/2009 ............ A01N 25/24 |
| WO | 2012125240 A | 9/2012 |
| WO | 2012154517 A1 | 11/2012 |

OTHER PUBLICATIONS

Espacenet English Abstract of EP0654465, Publication date May 5, 1995, 2 pages.

EPO and Google machine English translation of JP2011225869, Publication date Nov. 10, 2011.

EPO and Google machine English translation of JP2015074683, Publication date Apr. 20, 2015.

* cited by examiner

MULTIFUNCTIONAL POLYAMIDES FOR PROTECTIVE COATINGS

CROSS-REFERENCE TO RELATED APPLICATIONS

This application is the National Phase of International Application PCT/US2015/030446 filed May 13, 2015 which designated the U.S. and which claims priority to U.S. App. Ser. No. 61/992,949 filed May 14, 2014. The noted applications are incorporated herein by reference.

STATEMENT REGARDING FEDERALLY SPONSORED RESEARCH OR DEVELOPMENT

Not applicable.

FIELD OF THE INVENTION

The present disclosure is directed to multifunctional polyamides for use as curing agents in curable systems and to articles produced from curing such curable systems.

BACKGROUND OF THE INVENTION

Conventional polyamide curing agents for use in surface coatings and adhesives are generally prepared by the reaction of a diamine with a mono- or di-carboxylic acid (such as a long chain unsaturated fatty acid or a derivative thereof) in such manner as to create a polymeric molecule that is amine-terminated and contains amine moieties capable of reacting with an epoxy resin at ambient or elevated temperatures.

Examples of such conventional polyamide curing agents can be found in:

U.S. Pat. No. 5,319,062, which teaches a polyamide condensation reaction product between an alkylene polyamine having between 4-20 carbon atoms and dimeric acid mixture containing at least 50% by weight of a non-cyclic dimeric acid or alkyl ester thereof;

U.S. Pat. No. 5,948,881, which discloses an amine-terminated polyamide formed from fatty mono-acids, dimer acids, polyethylene polyamines and piperazine ring containing polyamines;

U.S. Pat. No. 6,111,030, which teaches a solid amine-terminated polyamide curing agent prepared by reacting an excess of a polyamine compound with a dicarboxylic acid where the ratio of equivalents of amine to acid groups 1.05:1 to no greater than 1.95:1;

U.S. Pat. No. 6,500,912, which discloses a liquid amine-terminated polyamide curing agent obtained from $C_{18}$-$C_{30}$ dicarboxylic acids and di- or polyamines;

U.S. Pat. Nos. 7,655,736 and 8,293,863, which describe a curing agent composition formed by reacting a multifunctional amine with a dimer fatty acid and where the curing agent may contain at least 15 mole % tetrahydropyrimidine-containing components; and U.S. Pat. Publ. No. 2012/0190799, which teaches a curing agent composition formed by reacting a multifunctional amine with a dimer acid and carboxylic monoacid and where the composition is free from tetrahydropyrimidine-containing components and piperazine-containing compounds.

While conventional polyamide curing agents provide many benefits including one or more of ease of use, low toxicity, cost efficiency, long working time or pot life, good adhesion, blush resistance, flexibility, and resistance to water, their disadvantages serve to limit their utility in certain cases. For instance, when used in curing epoxy resins at low temperature (for e.g. less than 10° C.), the curing reaction occurs over a long period of time and produces coatings having poor chemical resistance, a low glass transition temperature, poor heat resistance and low hardness. It is therefore an object of the present disclosure to provide a novel multifunctional polyamide curing agent that provides the beneficial properties exhibited by conventional polyamide curing agents while reducing the extent of their limitations.

SUMMARY OF THE INVENTION

This object has been achieved by providing a multifunctional polyamide obtained from the reaction of a polyamine and a polycarboxylic acid. The multifunctional polyamide may then be used in a two component curable system comprising:
 (A) a curable component comprising an epoxy resin; and
 (B) a curing agent component comprising the multifunctional polyamide.

The two component curable system may be used in a variety of applications, for example, in the field of surface protection, as a coating for a substrate, in electrical applications, such as potting and molding compositions, in laminating processes, in the fabrication of castings or of prepregs, in adhesive applications, and in civil engineering applications.

DETAILED DESCRIPTION OF THE INVENTION

If appearing herein, the term "comprising" and derivatives thereof are not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e. to at least one) of the grammatical object of the article. By way of example, "an epoxy" means one epoxy or more than one epoxy.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

As used herein the term "polycarboxylic acid" means a compound that has three (3) to five (5) carboxyl groups in the molecule. Examples of the polycarboxylic acid include various straight-chain aliphatic polycarboxylic acids, branched aliphatic polycarboxylic acids, cycloaliphatic polycarboxylic acids, aromatic polycarboxylic acids and the like.

If the specification states a component or feature "may", "can", "could", or "might" be included or have a characteristic, that particular component or feature is not required to be included or have the characteristic.

The present disclosure is generally directed to a curing agent component containing a multifunctional polyamide which is the reaction product of a polyamine and a polycarboxylic acid. The multifunctional polyamide reaction product that is formed will generally have at least nine reactive sites available for reaction making it highly reactive with a curable component, while also exhibiting low potential for intramolecular cyclization and formation of imidazoline. In comparison, conventional polyamide curing agents formed from mono- and di-carboxylic acids will usually have at most only six reactive sites available for reaction, and also readily form imidazoline. The higher functionality and smaller, less sterically hindered multifunctional polyamide of the present disclosure thus results in a curing component that can rapidly cure the curable component at low to ambient temperature to form a cured material having a higher glass transition temperature, improved chemical resistance, and good mechanical properties at elevated temperatures. Additionally, the toxicity of the multifunctional polyamide of the present disclosure is likely as good as or better than conventional polyamide curing agents.

According to one embodiment, the multifunctional polyamide is obtained by reacting a polyamine with a polycarboxylic acid. The polyamine may be any aliphatic, cycloaliphatic or aromatic compound containing two (2) or more amine groups, and in some particular embodiments two (2) to three (3) amine groups, while in other embodiments two (2) amine groups. The amine groups may be primary amine groups and/or secondary amine groups. As used herein, a primary amine group refers to an $NH_2$ which is bonded to an organic radical, and a secondary amine group refers to an NH group which is bonded to two organic radicals.

According to one particular embodiment, the polyamine is a compound according to formula (1)

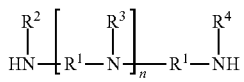

(1)

where $R^1$ is, each independently of the others, a divalent hydrocarbon radical having 1 to 20, and in some embodiments 2 to 12 carbon atoms, preferably a branched or unbranched alkylene radical having 1 to 20, and in some embodiments 2 to 6, carbon atoms, a cycloalkylene radical having 5 to 12, and in some embodiments 6 to 10, carbon atoms, or an aralkylene radical having 7 to 12, and in some embodiments 8 to 10, carbon atoms;

$R^2$, $R^3$ and $R^4$ are independently of one another, hydrogen, a hydrocarbon radical having 1 to 20, and in some embodiments 1 to 12, carbon atoms, preferably a branched or unbranched alkyl radical having 1 to 20, and in some embodiments 1 to 6, carbon atoms, a cycloalkylene radical having 5 to 12, and in some embodiments 6 to 10, carbon atoms, or an aralkylene radical having 7 to 12, and in some embodiments 8 to 10, carbon atoms, these radicals also being able to be interrupted by heteroatoms, or $R^2$ and $R^3$ are part of a saturated ring system having 3 to 8, and in some embodiments 3 to 4, carbon atoms; and n is 0 or an integer from 1 to 8, and in some embodiments 0 or an integer from 1 to 4.

According to another embodiment, the polyamine is a compound according to formula (2)

(2)

where R is selected from: a polyether compound of the formula (3)

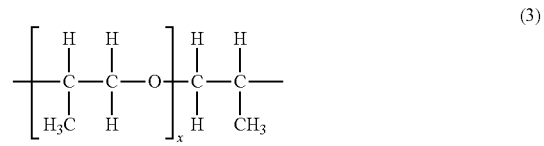

(3)

wherein x is from about 2 to about 70 and the compound of formula of (3) has a molecular weight from about 230 g/mol to about 4000 g/mol;

a polyether compound of the formula of the formula (4)

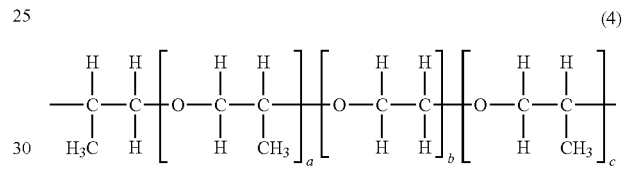

(4)

wherein b is from about 2 to about 40, a+c is from about 1 to about 6 and the compound of formula (4) has a molecular weight from about 220 g/mol to about 2000 g/mol;

a polyether compound of the formula (5)

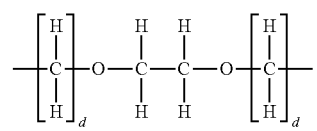

(5)

wherein d is 2 or 3; and
a polyether compound of the formula (6)

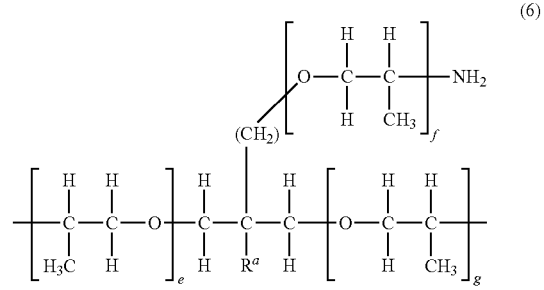

(6)

wherein $R^a$ is hydrogen or an ethyl group, p is 0 or 1, e+f+g is from about 5 to about 85 and the compound of formula (6) has a molecular weight from about 440 g/mol to about 5000 g/mol.

In one embodiment, the polyether compound of the formula (3) is a compound in which x is from about 2.5 to about 68, and in some embodiments x is from about 6 to about 33. In another embodiment, the polyether compound of the formula (3) is a compound in which x is about 6.1. In still another embodiment, the polyether compound of the formula (3) is a compound in which x is about 33.

In another embodiment, the polyether compound of the formula (4) is selected from a compound in which b is about 2.0 and a+c is about 1.2; b is about 9.0 and a+c is about 3.6; b is about 12.5 and a+c is about 6.0 and b is about 39 and a+c is about 6.0.

In yet another embodiment, the polyether compound of the formula (6) is a compound in which $R^a$ is an ethyl group, p is 1 and e+f+g is about 5 to 6. In another embodiment, the polyether compound of the formula (6) is a compound in which $R^a$ is hydrogen, p is 0 and e+f+g is 50. In still another embodiment, the polyether compound of the formula (6) is a compound in which $R^a$ is hydrogen, p is 0 and e+f+g is 85.

Examples of polyamines of formulae (1) and (2), include, but are not limited to: ethylenediamine, 1,2-diaminopropane, 1,3-diaminopropane, 1,3-diaminobutane, 1,4-diaminobutane, 1-amino-3-methylaminopropane, 2-methylpentamethylenediamine, pentamethylenediamine, hexamethylenediamine, trimethylhexamethylenediamine, neopentyldiamine, octamethylenediamine, cycloaliphatic diamines such as 1,2-, 1,3- or 1,4-cyclohexanediamine; 4,4'-methylenebiscyclohexylamine, isophoronediamine, menthanediamine, 4,4'-diamino-3,3'-dimethyldicyclohexylmethane, 3-aminomethyl-1-(3-aminopropyl-1-methyl)-4-methylcyclohexane, N-methylethylenediamine, N-aminoethylpiperazine, xylylenediamine, tricyclododecyldiamine, N-cyclohexylpropanediamine, methylbis(3-aminopropyl)amine, ethyl-bis(3-aminopropyl)amine, N-(3-aminopropyl)tetramethylenediamine, N,N'-bis(3-aminopropyl)tetramethylenediamine, polyalkylenepolyamines, such as 1,2-dipropylenetriamine, bis(3-aminopropyl)amine, 1,2-tripropylenetetramine, diethylenetriamine, triethylenetetramine and tetraethylenepentamine, the commercially available primary aliphatic polyoxypropylenediamines or -triamines, and also ether diamines such as 1,7-diamino-4-oxaheptane, 1,7-diamino-3,5-dioxaheptane, 1,10-diamino-4,7-dioxadecane, 1,10-diamino-4,7-dioxa-5-methyldecane, 1,11-diamino-4,8-dioxaundecane, 1,11-diamino-4,8-dioxa-5methylundecane, 1,12-diamino-4,9-dioxadodecane, 1,13-diamino-4,10-dioxatridecane, 1,13-diamino-4,7,10-trioxa-5,8-dimethyltridecane, 1,14-diamino-4,7,10-trioxatetradecane, 1,16-diamino-4,7,10,13-tetraoxahexadecane, and 1,20-diamino-4,17-dioxaeicosane, and the polyetheramines available under the Jeffamine® brand amines such as, for example, Jeffamine® D-4000, D-2000, D-400, D230, HK-511, ED-600, ED-900, ED-2003, EDR-148, EDR-176, T-403, T-3000 and T-5000 polyetheramines (available from Huntsman Corporation). Mixtures of the above polyamines can also be used.

In one particular embodiment, the polyamine is selected from 2-methylpentanediamine, diethylenetriamine, triethylenetetramine, isophoronediamine, m-xylylenediamine, trimethylhexamethylenediamine, 1,3-benzenedimethanamine (MXDA), 1,3-cyclohexanedimethanamine (1,3-BAC), 1,2-diaminocyclohexane (DACH), norbornanediamine, 5-amino-1,3,3-trimethylcyclo-hexainemethanamine (IPDA), 1,3-pentanediamine (DYTEK™ EP), 1,6-hexanediamine (HMDA), 4,4'-diaminodicyclohexylmethane (PACM), 1,2-ethanediamine (EDA), N-(2-aminoethyl)-1,2-ethanediamine, N-(2-aminoethyl)-N'-[(2-amino ethyl) amino-ethyl-1,2-ethanediamine (TEPA), aminoethylpiperazine and mixtures thereof. In a further embodiment, the polyamine is selected from 2-methylpentanediamine, diethylenetriamine, triethylenetetramine, isophoronediamine, m-xylylenediamine, trimethylhexamethylenediamine and mixtures thereof.

According to one embodiment, the polycarboxylic acid may be a tricarboxylic acid or tetracarboxylic acid, including, but not limited to, unsaturated aliphatic tricarboxylic and tetracarboxylic acids, saturated aliphatic tricarboxylic and tetracarboxylic acids, aromatic tricarboxylic and tetracarboxylic acids, unsaturated cyclic tricarboxylic and tetracarboxylic acids, and saturated cyclic tricarboxylic and tetracarboxylic acids. It is appreciated that any such polycarboxylic acids may be optionally substituted, such as with hydroxy, halo, alkoxy, and the like.

Examples of such tricarboxylic acids include butane-1,2,4-tricarboxylic acid, pentane-1,2,5-tricarboxylic acid, citric acid, 1,3,6-hexanetricarboxylic acid, cyclohexane-1,2,3-tricarboxylic acid, benzene-1,2,4-tricarboxylic acid, benzene-1,2,3-tricarboxylic acid, trimesic acid, naphthalene-1,2,4-tricarboxylic acid, naphthalene-1,2,5-tricarboxylic acid, naphthalene-1,4,5-tricarboxylic acid, naphthalene-2,3,5-tricarboxylic acid, naphthalene-2,3,6-tricarboxylic acid, diphenyl-3,4,4'-tricarboxylic acid, diphenyl-2,3,2'-tricarboxylic acid, diphenyl sulfone-3,4,3'-tricarboxylic acid, diphenyl ether-3,4,4'-tricarboxylic acid, benzophenone-3,4,4'-tricarboxylic acid, benzophenone-3,3',4-tricarboxylic acid, perylene-3,4,9-tricarboxylic acid, 2-(3,4-dicarboxyphenyl)-2-(3-carboxyphenyl)propane, 2-(2,3-dicarboxyphenyl)-2-(3-carboxyphenyl)propane, 1-(2,3-dicarboxyphenyl)-1-(3-carboxyphenyl)ethane, 1-(3,4-dicarboxyphenyl)-1-(4-carboxyphenyl)ethane, (2,3-dicarboxyphenyl)-(2-carboxyphenyl)methane, etc., heterocyclic tricarboxylic acids such as 2-(3',4'-dicarboxyphenyl)-5-(3'-carboxyphenyl-1,3,4-oxadiazole, 2-(3',4'-dicarboxydiphenyl ether)-5-(4'-carboxydiphenyl ether)-1,3,4-oxadiazole, 2-(3',4'-dicarboxyphenyl)-5-carboxybenzimidazole, 2-(3',4'-dicarboxyphenyl)-5-carboxybenzoxazole, 2-(3',4'-dicarboxyphenyl)-5-carboxybenzothiazole, pyridine-2,3,5-tricarboxylic acid, and mixtures thereof.

Examples of such tetracarboxylic acids include butane-1,2,3,4-tetracarboxylic acid, pentane-1,2,4,5-tetracarboxylic acid, cyclobutane-1,2,3,4-tetracarboxylic acid, cyclopentane-1,2,3,4-tetracarboxylic acid, cyclohexane-1,2,3,4-tetracarboxylic acid, mellophanic acid, 1,2,3,4-benzenetetracarboxylic, benzene-1,2,4,5-tetracarboxylic acid, naphthalene-1,4,5,8-tetracarboxylic acid, naphthalene-2,3,6,7-tetracarboxylic acid, naphthalene-1,2,4,5-tetracarboxilic acid, biphenyl-3,3',4,4'-tetracarboxylic acid, biphenyl-2,3,5,6-tetracarboxylic acid, biphenyl-2,2',3,3'-tetracarboxylic acid, biphenyl-2,2',6,6'-tetracarboxylic acid, benzophenone-3,3',4,4'-tetracarboxylic acid, benzophenone-2,2',3,3'tetracarboxylic acid, benzophenone-2,3,3',4'-tetracarboxylic acid, diphenyl ether-3,3',4,4'-tetracarboxylic acid, diphenyl sulfone-3,3',4,4'-tetracarboxylic acid, perylene-3,4,9,10-tetracarboxylic acid, phenanthrene-1,8,9,10-tetracarboxylic acid, anthracene-2,3,6,7-tetracarboxylic acid, p-benzoquinone-2,3,5,6-tetracarboxylic acid, azobenzene-3,3',4,4'-tetracarboxylic acid, 2,2-bis(3,4-dicarboxyphenyl)propane, 2,2-bis(2,3-dicarboxyphenyl)propane, 1,1-bis(2,3-dicarboxyphenyl)ethane, 1,1-bis(3,4-dicarboxyphenyl)ethane, bis(2,3-dicarboxyphenyl)methane, bis(3,4-dicarboxyohenyl)methane, 2,2-bis(3,4-dicarboxyphenyl)hexafluoropropane, thiophene-2,3,4,5-tetracarboxylic acid, furan-2,3,4,5-tetracarboxylic acid, pyridine-2,3,5,6-tetracarboxylic acid, and mixtures thereof.

In preparing the multifunctional polyamides of the present disclosure, the ratio of amine to acid groups (i.e. $NH_x$: COOH groups, where x is 1 or 2) may be greater than about 0.75:1 equivalents $NH_x$:COOH. In other embodiments, the ratio may be greater than about 0.9:1 equivalents $NH_x$:COOH, while in still other embodiments the ratio may be greater than about 1:1 equivalents $NH_x$:COOH. In further embodiments, the ratio may be less than about 4:1 equivalents NHx:COOH, while in other embodiments, the ratio may be less than about 3:1 equivalents NHx:COOH, while in still other embodiments, the ratio may be less than about 2:1 NHx:COOH. In still further embodiments, the ratio may be between about 0.75:1 to about 2:1 equivalents NHx:COOH, while in still further embodiments, the ratio may be between about 1.05:1 to about 1.95:1 equivalents NHx:COOH, while in still even further embodiments, the ratio may range between about 1.1:1 to about 1.8:1 equivalents NHx:COOH.

According to another embodiment, an excess of polyamine is used to insure the resulting multifunctional polyamide has more amine end groups than acid end groups. In accordance therewith, the ratio of amine to acid groups is greater than 1:1 equivalents NHx:COOH, and in some embodiments, the ratio is greater than 1.03:1 equivalents NHx:COOH, and in still other embodiments, the ratio is greater than 1.05:1 equivalents NHx:COOH. Stated another way, the amount of polyamine employed, in addition to the equivalent amount is greater than 3% by weight, and in other embodiments greater than 5% by weight, while in still other embodiments greater than 10% by weight, based on the total weight of the polyamine in the polyamine+polycarboxylic acid mixture.

Catalysts may optionally be employed to accelerate and improve the efficiency of the reaction. Examples include acid compounds, such as phosphoric acid, oxides or carbonates of alkaline nature, such as magnesium oxide or calcium oxide, and halogen salts of polyvalent metals and acids. The catalyst may be present in an amount of from about 0% by weight to about 3% by weight, based on the total weight of the polyamine+polycarboxylic acid.

The reaction between the polyamine and polycarboxylic acid may carried out by any number of processes known to those skilled in the art. For example, the polyamine and polycarboxylic acid may be combined at a temperature ranging from room temperature to about 100° C. Heat may then be applied to raise the temperature as water is being condensed from the reaction mixture. Heating is normally continued until the specified amount of water is removed that will yield the desired multifunctional polyamide. Optionally, vacuum can be applied, especially in the later stages of the reaction, to aid in the removal of water and unreacted polyamine, if present, from the mixture. To reduce foaming, small amounts of defoamers may be added such as acrylic copolymers containing 2-ethylhexyl acrylate, polysiloxane copolymers, and the like. The cooled solid multifunctional polyamide product may then be milled to a fine powder, for example, and/or diluted with solvent or plasticizer.

In another embodiment where an excess of polyamine is used, prior to applying vacuum, the multifunctional polyamide-polyamine mixture may be co-reacted with a quantity of diepoxide or other epoxy functional compound, such as bisphenol A liquid epoxy resin, bisphenol F liquid epoxy resin, epoxy cresol novolac resin, or monoglycidyl ether of cashew nut shell liquid (ARALDITE® DY-CNO), in an amount that is less than the number of moles of free polyamine available such that the reaction product does not become an infusible solid (gel) upon complete reaction of the diepoxide. Vacuum may then be applied to remove any free polyamine (in most cases, less than 1% by weight polyamine remaining, based on the total weight of the mixture). The resulting product mixture will contain the multifunctional polyamide and an amine-terminated adduct of the diepoxide or epoxy functional compound and polyamine. This product mixture may optionally be further modified by reaction with another reactive compound and/or physically blended with a solvent. Examples of solvents include pentamethylbenzene, m-terphenyl, xylene, cresol, toluene, benzene, ethylbenzene, 1,3,5-triisopropylbenzene, o-dichlorobenzene, 1,2,4-trichlorobenzene, cyclohexane, cyclopentane, phenol, naphthalene, 1,2,3,4-tetrahydronaphthalene (tetralin), acetophenone, benzophenone, diphenylsulfone, N-methylpyrrolidinone (N-methylpyrrolidone), N-butylpyrrolidinone (N-butylpyrrolidone), N-ethylpyrrolidone, N-methyl-2-pyrrolidone, 1,3-dimethyl-2-pyrrolidone, N,N-dimethylformamide, dimethylacetoamide, hexamethylphosphoramide, dimethylsulfoxide, nitromethane, acetonitrile, pyridine, 1,3-dimethyl-2-imidazolidinone, Y-butylolactone and mixtures thereof.

In still another embodiment, where an excess of polyamine is used, prior to applying vacuum, the multifunctional polyamide-polyamine mixture can be co-reacted with a functional surfactant, such as those described in U.S. Pat. Nos. 7,300,963, and 5,565,505, the contents of which are hereby incorporated by reference. Examples of functional surfactants include: at least one epoxidized polyalkylene oxide selected from the group of epoxidized polyethylene oxides, epoxidized polypropylene oxides, epoxidized polyethylene propylene oxides and mixtures thereof. In the context of the present disclosure, epoxidized polyethylene oxides are understood to be compounds which can be obtained by converting the two terminal OH groups of polyethylene oxide into oxirane groups, for example by reaction with epichlorohydrin. The polyethylene oxide used may have an average molecular weight of 80 to 3,000 and may be produced by starting the polymerization of the ethylene oxide with a $C_{2-18}$ alkylene diol, as known to those skilled in the art. In the context of the present disclosure, epoxidized polypropylene oxides are understood to be compounds which can be obtained by converting the two terminal OH groups of polypropylene oxide into oxirane groups, for example by reaction with epichlorohydrin. The polypropylene oxide used may have an average molecular weight of 110 to 3,000 and may be produced by starting the polymerization of the propylene oxide with a $C_{2-18}$ alkylene diol, as known to the expert. In the context of the present disclosure, polyethylene propylene oxides are understood to be compounds which can be obtained by converting the two terminal OH groups of polyethylene propylene oxide into oxirane groups, for example by reaction with epichlorohydrin. The polyethylene propylene oxide used may have an average molecular weight of 80 to 3,000. Polyethylene propylene oxides are compounds obtainable by copolymerization of ethylene and propylene oxide, the polymerization of the two reactants being carried out simultaneously or block-wise by starting the polymerization of the propylene oxide and/or the ethylene oxide with a $C_{2-18}$ alkylene diol, as known to the expert. The compounds may be used individually or in the form of mixtures with one another.

The resulting product mixture containing the multifunctional polyamide and amine-terminated adduct of the functional surfactant and polyamine may then also be optionally further physically blended with water or a solvent.

The multifunctional polyamide of the present disclosure may be used to cure a curable component. According to one embodiment, the curable component contains an epoxy resin. In general, any epoxy-containing compound is suitable for use as the epoxy resin in the present disclosure, such as the epoxy-containing compounds disclosed in U.S. Pat. No. 5,476,748 which is incorporated herein by reference. In one embodiment, the epoxy resin is selected from the group of: a polyglycidyl epoxy compound; a non-glycidyl epoxy compound; an epoxy cresol novolac compound; and an epoxy phenol novolac compound.

The polyglycidyl epoxy compound may be a polyglycidyl ether, poly(β-methylglycidyl) ether, polyglycidyl ester or poly(β-methylglycidyl) ester. The synthesis and examples of polyglycidyl ethers, poly(β-methylglycidyl) ethers, polyglycidyl esters and poly(β-methylglycidyl) esters are disclosed in U.S. Pat. No. 5,972,563, which is incorporated herein by reference. For example, ethers may be obtained by reacting a compound having at least one free alcoholic hydroxyl group and/or phenolic hydroxyl group with a suitably substituted epichlorohydrin under alkaline conditions or in the presence of an acidic catalyst followed by alkali treatment. The alcohols may be, for example, acyclic alcohols, such as ethylene glycol, diethylene glycol and higher poly(oxyethylene) glycols, propane-1,2-diol, or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, bistrimethylolpropane, pentaerythritol and sorbitol. Suitable glycidyl ethers may also be obtained, however, from cycloaliphatic alcohols, such as 1,3- or 1,4-dihydroxycyclohexane, bis(4-hydroxycyclo-hexyl)methane, 2,2-bis(4-hydroxycyclohexyl)propane or 1,1-bis(hydroxymethyl)cyclohex-3-ene, or they may possess aromatic rings, such as N,N-bis (2-hydroxyethyl)aniline or p,p'-bis(2-hydroxyethylamino) diphenylmethane.

Particularly important representatives of polyglycidyl ethers or poly(β-methylglycidyl)ethers are based on monocyclic phenols, for example, on resorcinol or hydroquinone, on polycyclic phenols, for example, on bis(4-hydroxyphenyl)methane (Bisphenol F), 2,2-bis(4-hydroxyphenyl)propane (Bisphenol A), bis(4-hydroxyphenyl)S (Bisphenol S), alkoxylated Bisphenol A, F or S, triol extended Bisphenol A, F or S, brominated Bisphenol A, F or S, hydrogenated Bisphenol A, F or S, glycidyl ethers of phenols and phenols with pendant groups or chains, on condensation products, obtained under acidic conditions, of phenols or cresols with formaldehyde, such as phenol novolaks and cresol novolaks, or on siloxane diglycidyls.

Polyglycidyl esters and poly(P-methylglycidyl)esters may be produced by reacting epichlorohydrin or glycerol dichlorohydrin or β-methylepichlorohydrin with a polycarboxylic acid compound. The reaction is expediently carried out in the presence of bases. The polycarboxylic acid compounds may be, for example, glutaric acid, adipic acid, pimelic acid, suberic acid, azelaic acid, sebacic acid or dimerized or trimerized linoleic acid. Likewise, however, it is also possible to employ cycloaliphatic polycarboxylic acids, for example tetrahydrophthalic acid, 4-methyltetrahydrophthalic acid, hexahydrophthalic acid or 4-methylhexahydrophthalic acid. It is also possible to use aromatic polycarboxylic acids such as, for example, phthalic acid, isophthalic acid, trimellitic acid or pyromellitic acid, or else carboxyl-terminated adducts, for example of trimellitic acid and polyols, for example glycerol or 2,2-bis(4-hydroxycyclohexyl)propane, may be used.

In another embodiment, the epoxy resin is a non-glycidyl epoxy compound. Non-glycidyl epoxy compounds may be linear, branched, or cyclic in structure. For example, there may be included one or more epoxide compounds in which the epoxide groups form part of an alicyclic or heterocyclic ring system. Others include an epoxy-containing compound with at least one epoxycyclohexyl group that is bonded directly or indirectly to a group containing at least one silicon atom. Examples are disclosed in U.S. Pat. No. 5,639,413, which is incorporated herein by reference. Still others include epoxides which contain one or more cyclohexene oxide groups and epoxides which contain one or more cyclopentene oxide groups.

Particularly suitable non-glycidyl epoxy compound's include the following difunctional non-glycidyl epoxide compounds in which the epoxide groups form part of an alicyclic or heterocyclic ring system: bis(2,3-epoxycyclopentyl)ether, 1,2-bis(2,3-epoxycyclopentyloxy)ethane, 3,4-epoxycyclohexyl-methyl 3,4-epoxycyclohexanecarboxylate, 3,4-epoxy-6-methyl-cyclohexylmethyl 3,4-epoxy-6-methylcyclohexanecarboxylate, di(3,4-epoxycyclohexylmethyl)hexanedioate, di(3,4-epoxy-6-methylcyclohexylmethyl) hexanedioate, ethylenebis(3,4-epoxycyclohexanecarboxylate), ethanediol di(3,4-epoxycyclohexylmethyl.

Highly preferred difunctional non-glycidyl epoxies include cycloaliphatic difunctional non-glycidyl epoxies, such as 3,4-epoxycyclohexyl-methyl 3',4'-epoxycyclohexanecarboxylate and 2,2'-bis-(3,4-epoxy-cyclohexyl)-propane, with the former being most preferred.

In another embodiment, the epoxy resin is a poly(N-glycidyl) compound or poly(S-glycidyl) compound. Poly(N-glycidyl) compounds are obtainable, for example, by dehydrochlorination of the reaction products of epichlorohydrin with amines containing at least two amine hydrogen atoms. These amines may be, for example, n-butylamine, aniline, toluidine, m-xylylenediamine, bis(4-aminophenyl)methane or bis(4-methylaminophenyl)methane. Other examples of poly(N-glycidyl) compounds include N,N'-diglycidyl derivatives of cycloalkyleneureas, such as ethyleneurea or 1,3-propyleneurea, and N,N'-diglycidyl derivatives of hydantoins, such as of 5,5-dimethylhydantoin. Examples of poly(S-glycidyl) compounds are di-S-glycidyl derivatives derived from dithiols, for example ethane-1,2-dithiol or bis(4-mercaptomethylphenyl)ether.

It is also possible to employ epoxy resins in which the 1,2-epoxide groups are attached to different heteroatoms or functional groups. Examples include the N,N,O-triglycidyl derivative of 4-aminophenol, the glycidyl ether/glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

Other epoxide derivatives may also be employed, such as vinyl cyclohexene dioxide, limonene dioxide, limonene monoxide, vinyl cyclohexene monoxide, 3,4-epoxycyclohexlmethyl acrylate, 3,4-epoxy-6-methyl cyclohexylmethyl 9,10-epoxystearate, and 1,2-bis(2,3-epoxy-2-methylpropoxy)ethane.

Additionally, the epoxy resin may be a pre-reacted adduct of an epoxy resin, such as those mentioned above, with known hardeners for epoxy resins.

As described above, the curing agent component containing the multifunctional polyamide can be formulated with or without solvent. The curing component may then be stored separately from the curable component to form a two component curable system and used in coating or adhesive applications. Thus, there is provided a two component curable system including a first container comprising the curing agent component containing the multifunctional polyamide obtained from the reaction of the polyamine and polycarboxylic acid and optionally a solvent and a second container comprising the curable component containing the epoxy resin.

In yet another embodiment there is provided a method for preparing the two component curable system including (1) providing the curable component comprising the epoxy resin in one container and (2) providing the curing agent component containing the multifunctional polyamide obtained from the reaction of the polyamine and polycarboxylic acid and optionally a solvent in a second container. The amount of curing agent component used in the two component system is an amount sufficient to cure the curable component and form a continuous coating. In one embodiment, the amounts of the curing agent component and curable component used in the curable systems are such that the ratio of epoxy equivalents in the curable component to amine equivalents in the curing agent component is from 0.5:1 to 2:1; in some instances from 0.6:1.4 to 1.4:0.6; and in more instances from 0.8:1.2 to 1.2:0.8 and even more instances from 0.9:1.1 to 1.1:0.9.

The curable system according to the present disclosure may be water borne or solvent borne and thus may comprise water or solvent. If desired, either one or both of the curable component and curing agent component may also be mixed with one or more customary additives, for example, a stabilizer, extender, filler, reinforcing agent, pigment, dyestuff, plasticizer, tackifier, rubber, accelerator, or any mixture thereof prior to storage or use.

Stabilizers which may be employed include: phenothiazine itself or C-substituted phenothiazines having 1 to 3 substituents or N-substituted phenothiazines having one substituent for example, 3-methyl-phenothiazine, 3-ethyl-phenothiazine, 10-methyl-phenothiazine; 3-phenyl-phenothiazine, 3,7-diphenyl-phenothiazine; 3-chlorophenothiazine, 2-chlorophenothiazine, 3-bromophenothiazine; 3-nitrophenothiazine, 3-aminophenothiazine, 3,7-diaminophenothiazine; 3-sulfonyl-phenothiazine, 3,7-disulfonyl-phenothiazine, 3,7-dithiocyanatophenthiazin; substituted quinines and catechols, copper naphthenate, zinc-dimethyl-dithiocarbonate and phosphotungistic acid hydrate. Extenders, reinforcing agents, fillers accelerators and pigments which can be employed include, for example: coal tar, bitumen, glass fibers, boron fibers, carbon fibers, cellulose, polyethylene powder, polypropylene powder, mica, asbestos, quartz powder, gypsum, antimony trioxide, bentones, silica aerogel ("aerosil"), lithopone, barite, titanium dioxide, eugenol, dicummyl peroxide, isoeugenol, carbon black, graphite, and iron powder. It is also possible to add other additives, for example, flameproofing agents, flow control agents such as silicones, cellulose acetate butyrate, polyvinyl butyrate, waxes, stearates and the like (which are in part also used as mold release agents).

According to another embodiment, the curing agent component may be combined with zinc metal (dust) without generation of hydrogen gas. This is useful in those embodiments where the curing agent component will be used in preparing curable systems for use as water borne, two component zinc-rich primers for metal protection.

In another embodiment, the present disclosure provides a method of forming a coating from the two component curable system. The method includes contacting the curing agent component with the curable component and subjecting the mixture to curing conditions to cure the mixture such curing conditions being either under ambient conditions and/or under heat.

Thus, the mixture may be allowed to cure at ambient conditions for any period of time sufficient to allow it to harden, such as, for example from 1 minute to about 10 days. In one embodiment, the mixture is cured at low temperatures, for example at a temperature less than about 10° C.) for a period of time, for example, from about 1 minute to about 3 days. In another embodiment, in order to achieve more rapid and/or more complete curing, the mixture obtained from the two component system according to the present disclosure is heated at 50° C. to 120° C. for any period of time, such as for about 1 minute to about 24 hours. The mixture may be applied to and cured upon any substrate or article. Thus, in yet another embodiment there is provided an article or substrate coated with the two component system of the present disclosure.

According to one embodiment, the two component system is used as a protective coating for a substrate. The curing agent component may be applied to one or more surfaces of a substrate, prior to, subsequently to, or simultaneously with the curable component, at a desired thickness by methods well known to those skilled in the art, such as, spraying, dipping, brushing, painting, roller coating, etc. After application, the coating is cured at low temperatures (for e.g. less than 10° C.) or at temperatures above 20° C., or at low temperatures (for e.g. less than 10° C.) for a period of time, such as for about 1 minute to about 24 hours, followed by the application of heat. The substrate may be, but is not limited to, cement, metal, concrete, brick, cement board, ceramic, wood, fiber, glass, plastic or sheetrock. The two part curable composition may be used as either a primer, mid- or topcoat coating or surface protectant.

In still another embodiment, there is provided a cured coating obtained from the method of curing the two component curable system of the present disclosure. In one particular embodiment, the cured coating is obtained by curing the two component curable system at ambient temperature conditions, such as at about 20° C., or at low temperatures, such as at or below 10° C.

According to another embodiment, the two component curable system is used as an adhesive to bond at least two substrates together. The method includes:
 i. providing a part (A) containing a curable component comprising an epoxy resin;
 ii. providing a part (B) containing a curing agent component comprising a multifunctional polyamide obtained from the reaction of a polyamine and polycarboxylic acid;
 iii. contacting parts (A) and (B) to form a mixture;
 iv. applying the mixture to at least one surface of one or more of the substrates; and
 v. matingly engaging the surfaces of the substrates which are to be bonded together permitting the mixture to cure to form a bond there between.

It is generally contemplated that the two components will be mixed in about a 1:1 ratio by volume, but the ratio will depend on the components contained in each part and therefore may vary. Thus, in some embodiments, part (A) and part (B) may be mixed in about a 5:1 to 1:5 ratio by volume, while in other embodiments part (A) and part (B) may be mixed in about a 10:1 to 1:10 ratio by volume.

In one embodiment, parts (A) and (B), after mixing, are applied to the surface of at least one substrate by brushing, rolling, spraying, dotting, or kniving to the surface of at least one of the substrates. The surface may be untreated, oily, etc. The substrates to be adhered may be clamped for firmness during cure in those installations where relative movement of the substrates might be expected. For example, to adhere two substrate surfaces, an adherent quantity of the mixture is applied to at least one surface, preferably to both surfaces, and the surfaces are contacted with the mixture therebetween. The smoothness of the surfaces and their clearance will determine the required film thickness for optimum bonding. The surfaces and the interposed mixture are then maintained in engagement until the mixture has cured sufficiently to bond the surfaces. Curing may occur at ambient temperature conditions (for example, about 20° C. or less) or under the application of heat. Examples of substrates which the curable composition may be applied to include, but are not limited to, steel, galvanized steel, aluminum, copper, brass, wood, glass, paper, composites, ceramics, plastics and polymeric materials such as polyester, polyamide, polyurethane, polyvinyl chloride, polycarbonates, ABS plastics, and Plexiglas.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A curing agent component for use in curing a curable component, the curing agent component comprising (I) a multifunctional polyamide and (II) a non-gelled amine-terminated adduct of (a) a diepoxide or an epoxy functional compound and (b) a polyamine, wherein the curing agent component is obtained from the reaction of a mixture of (i) the polyamine, (ii) a polycarboxylic acid selected from the group consisting of a straight chained aliphatic polycarboxylic acid having 3 to 5 carboxyl groups, a branched aliphatic polycarboxylic acid having 3 to 5 carboxyl groups, a cycloaliphatic polycarboxylic acid having 3 to 5 carboxyl groups and a mixture thereof, and (iii) the diepoxide or the epoxy functional compound, and wherein the ratio of amine to acid groups in the mixture is greater than 1:1 equivalents.

2. The curing agent component of claim 1, wherein the polyamine is a compound according to formula (1)

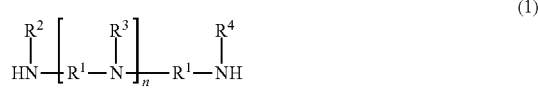

(1)

where $R^1$ is, each independently of the others, a branched or unbranched alkylene radical having 1 to 20 carbon atoms, a cycloalkylene radical having 5 to 12 carbon atoms, or an aralkylene radical having 7 to 12 carbon atoms;

$R^2$, $R^3$ and $R^4$ are independently of one another, hydrogen, a branched or unbranched alkyl radical having 1 to 20 carbon atoms, a cycloalkylene radical having 5 to 12 carbon atoms, or an aralkylene radical having 7 to 12 carbon atoms, these radicals also being able to be interrupted by heteroatoms, or $R^2$ and $R^3$ are part of a saturated ring system having 3 to 8 carbon atoms; and n is 0 or an integer from 1 to 8.

3. The curing agent component of claim 2, wherein the polyamine is selected from 2-methylpentanediamine, diethylenetriamine, triethylenetetramine, isophoronediamine, m-xylylenediamine, trimethylhexamethylenediamine, 1,3-benzenedimethanamine (MXDA), 1,3-cyclohexanedimethanamine (1,3-BAC), 1,2-diaminocyclohexane (DACH), norbornanediamine, 5-amino-1,3,3-trimethylcyclohexainemethanamine (IPDA), 1,3-pentanediamine, 1,6-hexanediamine (HMDA), 4,4'-diaminodicyclohexylmethane (PACM), 1,2-ethanediamine (EDA), N-(2-aminoethyl)-1,2-ethanediamine, N-(2-aminoethyl)-N'-[(2-aminoethyl)amino-ethyl-1,2-ethanediamine (TEPA), aminoethylpiperazine and a mixture thereof.

4. The curing agent component of claim 1, wherein the polyamine is a compound according to formula (2)

where R is selected from: a polyether compound of the formula (3)

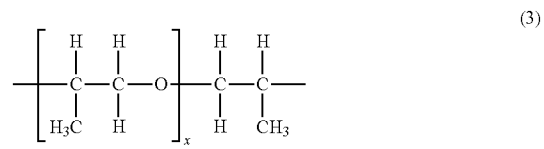

wherein x is from about 2 to about 70 and having a molecular weight from about 230 g/mol to about 4000 g/mol;

a polyether compound of the formula (4)

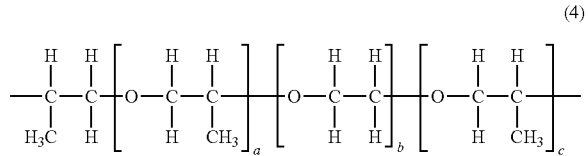

wherein b is from about 2 to about 40, a+c is from about 1 to about 6 and having a molecular weight from about 220 g/mol to about 2000 g/mol;

a polyether compound of the formula (5)

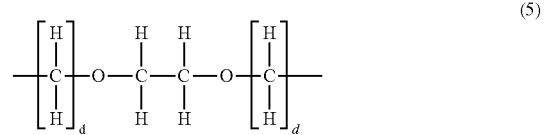

wherein d is 2 or 3; and a polyether compound of the formula (6)

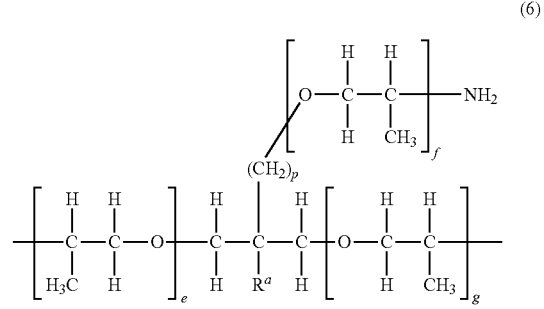

wherein $R^a$ is hydrogen or an ethyl group, p is 0 or 1, e+f+g is from about 5 to about 85 and having a molecular weight from about 440 g/mol to about 5000 g/mol.

5. The curing agent component of claim 2, wherein the polycarboxylic acid has 3 carboxyl groups or 4 carboxyl groups.

6. The curing agent component of claim 5, wherein the polycarboxylic acid has 3 carboxyl groups and is selected from butane-1,2,4-tricarboxylic acid, pentane-1,2,5-tricarboxylic acid, citric acid, 1,3,6-hexanetricarboxylic acid, cyclohexane-1,2,3-tricarboxylic acid, and a mixture thereof.

7. The curing agent component of claim 1, wherein the multifunctional polyamide has more amine end groups than acid end groups.

8. A two component curable system comprising:
(A) a first container containing a curable component comprising an epoxy resin; and
(B) a second container containing a curing agent component comprising the multifunctional polyamide of claim 1.

9. The two component curable system of claim 8, wherein the polyamine is selected from 2-methylpentanediamine, diethylenetriamine, triethylenetetramine, isophoronediamine, m-xylylenediamine, trimethylhexamethylenediamine, 1,3-benzenedimethanamine (MXDA), 1,3-cyclohexanedimethanamine (1,3-BAC), 1,2-diaminocyclohexane (DACH), norbornanediamine, 5-amino-1,3,3-trimethylcyclo-hexainemethanamine (IPDA), 1,3-pentanediamine, 1,6-hexanediamine (HMDA), 4,4'-diaminodicyclohexylmethane (PACM), 1,2-ethanediamine (EDA), N-(2-aminoethyl)-1,2-ethanediamine, N-(2-aminoethyl)-N'-[(2-aminoethyl)amino-ethyl-1,2-ethanediamine (TEPA), aminoethylpiperazine and a mixture thereof and the polycarboxylic acid is a tricarboxylic acid.

10. A method for preparing a two-component curable system comprising: providing a curable component comprising an epoxy resin in one container; and providing a curing agent component comprising the multifunctional polyamide of claim 1 and optionally a solvent in a second container.

11. A method of forming a coating from a two component curable system comprising the steps of: contacting a curing agent component comprising an epoxy resin with a curable component comprising a multifunctional polyamide of claim 1 and optionally a solvent; and subjecting the mixture to curing conditions to cure the mixture.

12. A method for forming a protective coating on a substrate comprising: applying a curing agent component comprising the multifunctional polyamide of claim 1 and optionally a solvent to one or more surfaces of a substrate, prior to, subsequently to, or simultaneously with a curable component comprising an epoxy resin to form a coating and curing coating at ambient conditions.

13. The method of claim 12 wherein the substrate is cement, metal, concrete, brick, cement board, ceramic, wood, fiber, glass, plastic or sheetrock.

14. A method of bonding at least two substrates together comprising:
i. providing a part (A) containing a curable component comprising an epoxy resin;
ii. providing a part (B) containing a curing agent component comprising the multifunctional polyamide of claim 1;
iii. contacting parts (A) and (B) to form a mixture;
iv. applying the mixture to at least one surface of one or more of the substrates; and
v. matingly engaging the surfaces of the substrates which are to be bonded together permitting the mixture to cure to form a bond there between.

* * * * *